May 7, 1968      L. M. HASKINS      3,381,870

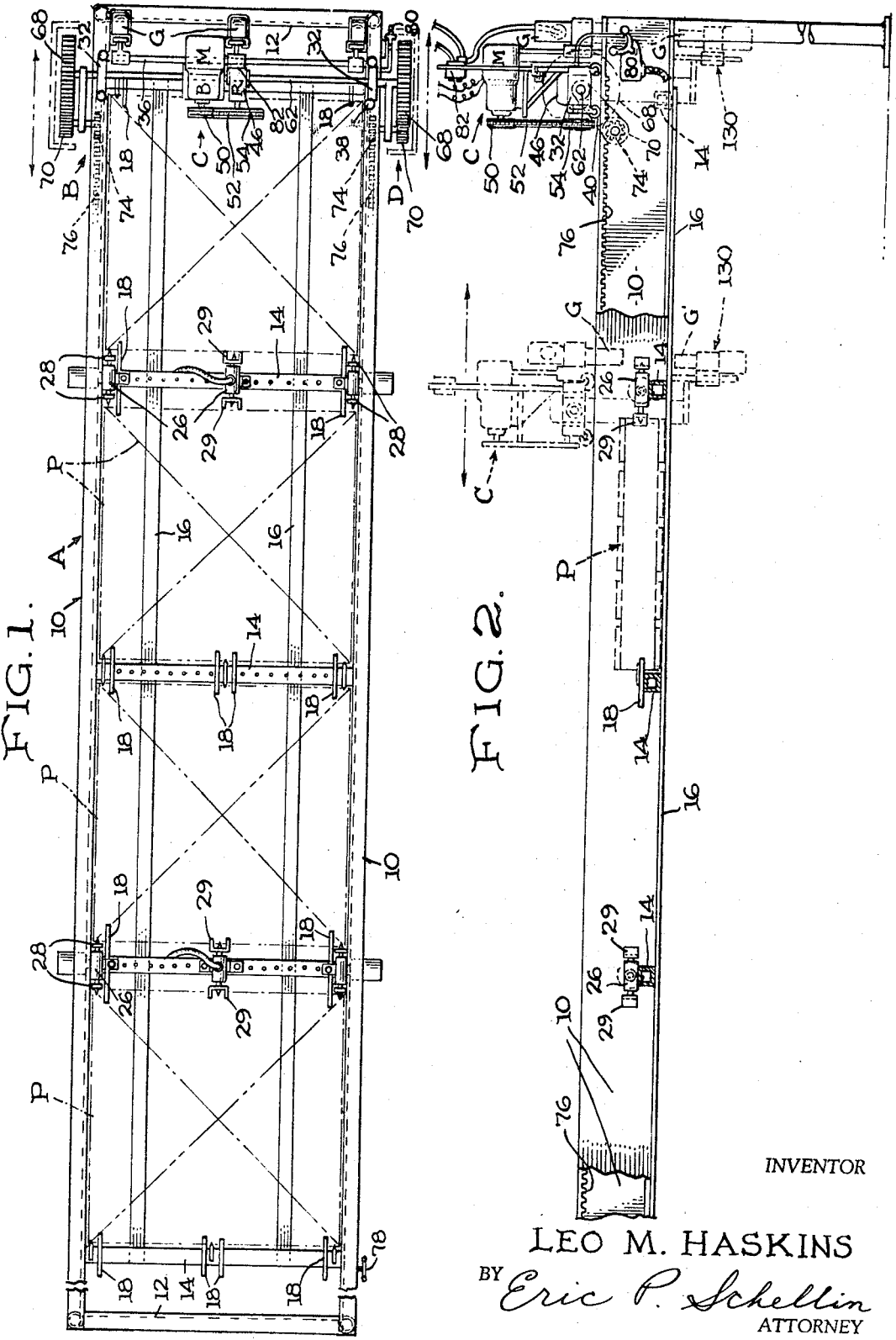

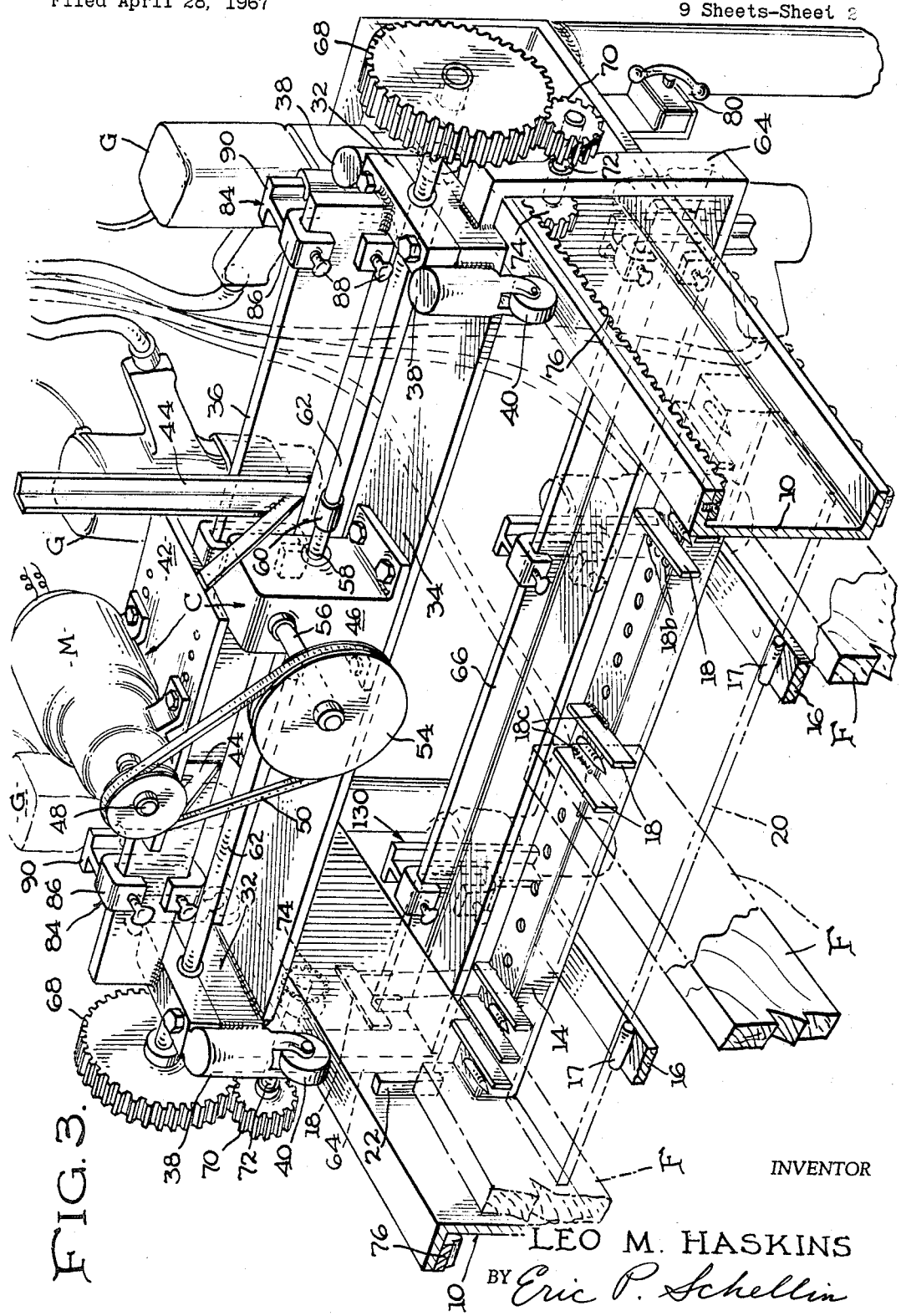

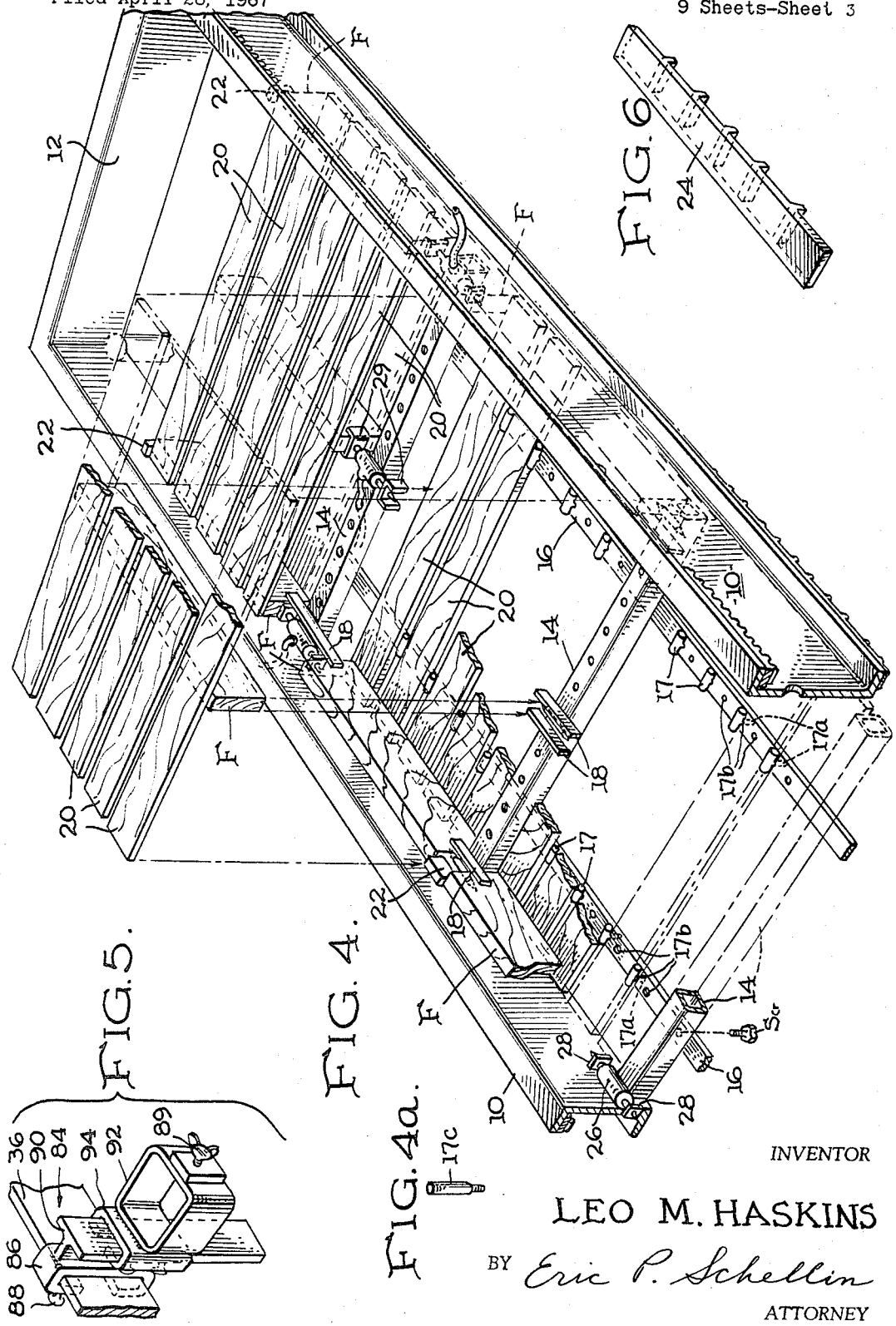

AUTOMATIC NAILING AND STAPLING MACHINE

Filed April 28, 1967      9 Sheets-Sheet 4

INVENTOR

LEO M. HASKINS

BY Eric P. Schellin

ATTORNEY

May 7, 1968  L. M. HASKINS  3,381,870
AUTOMATIC NAILING AND STAPLING MACHINE
Filed April 28, 1967  9 Sheets-Sheet 5
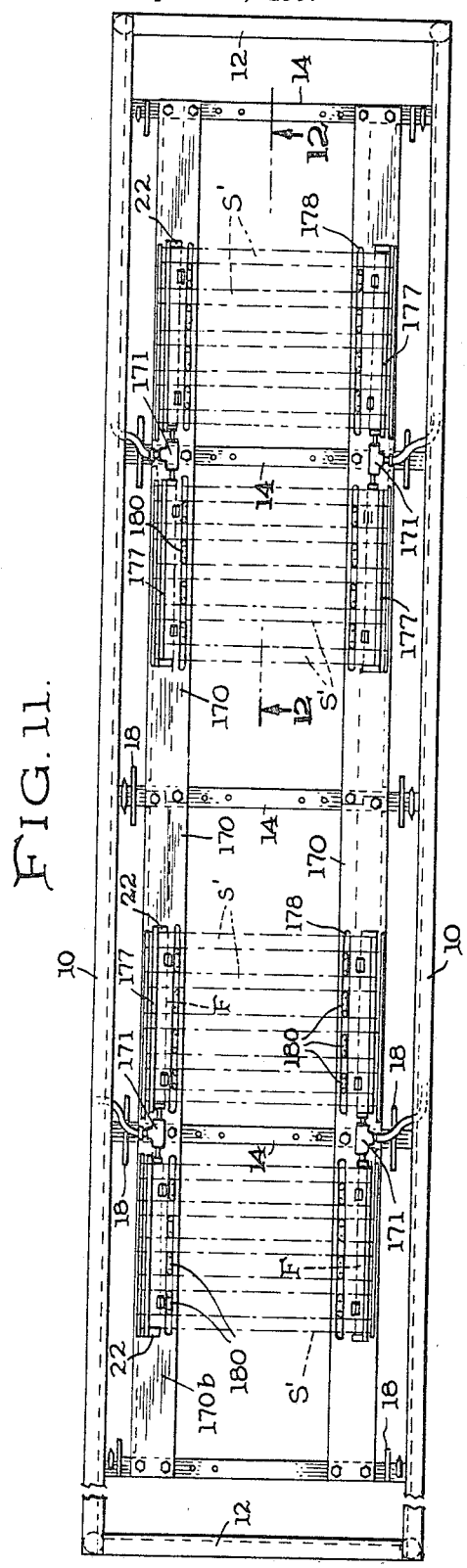
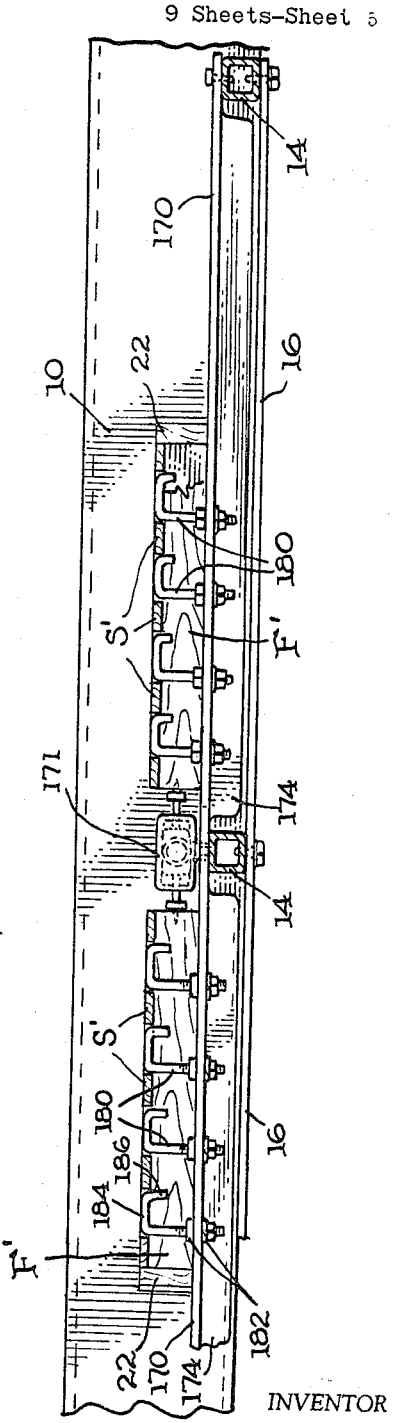
INVENTOR
LEO M. HASKINS
BY Eric P. Schellin
ATTORNEY May 7, 1968

L. M. HASKINS 3,381,870

AUTOMATIC NAILING AND STAPLING MACHINE

Filed April 28, 1967

INVENTOR

LEO M. HASKINS

BY *Eric P. Schellin*

ATTORNEY

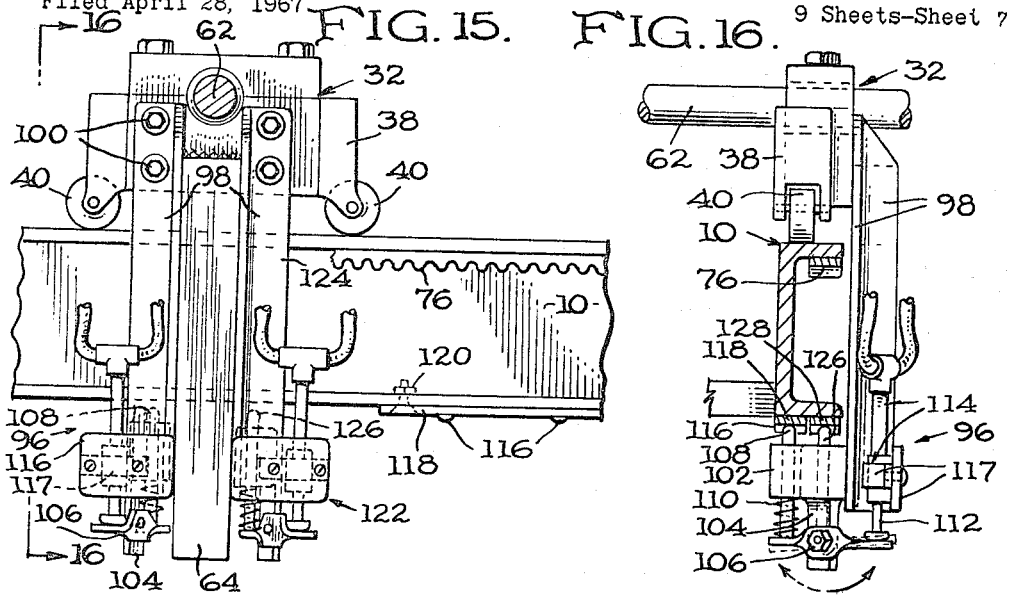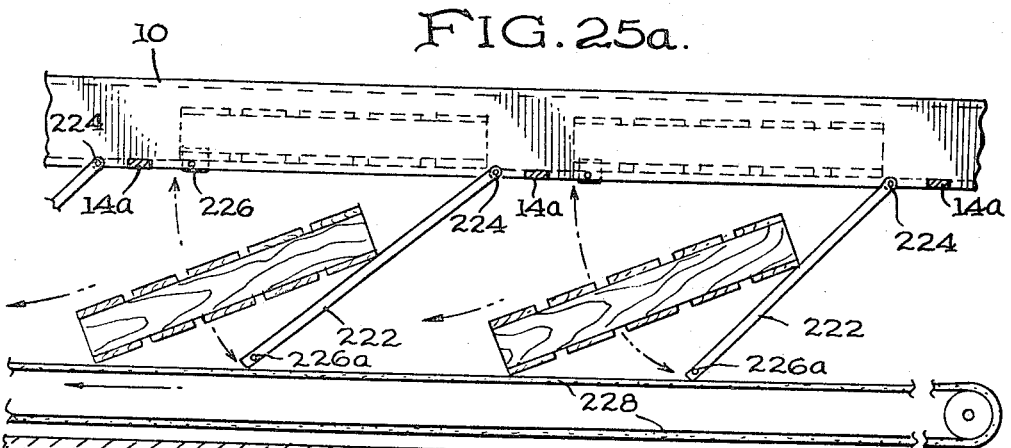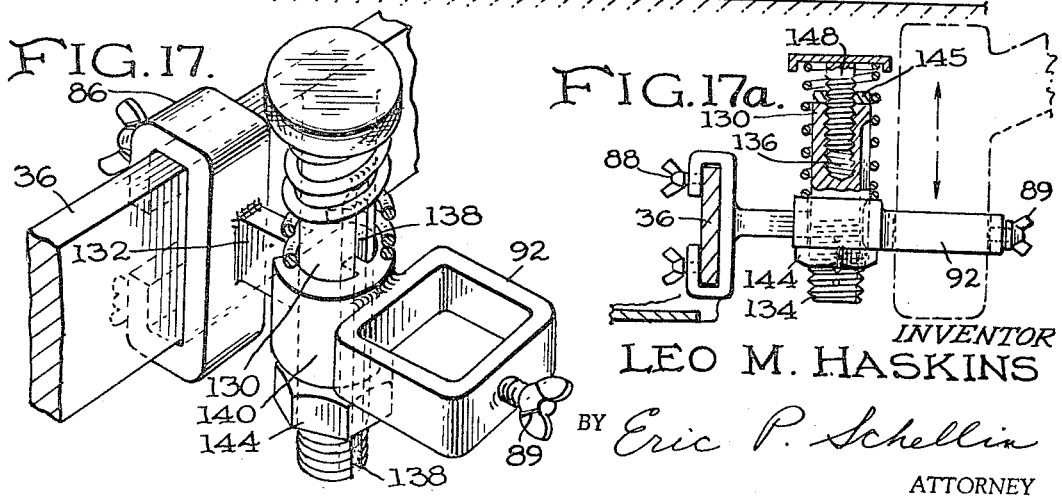

May 7, 1968   L. M. HASKINS   3,381,870
AUTOMATIC NAILING AND STAPLING MACHINE
Filed April 28, 1967   9 Sheets-Sheet 8
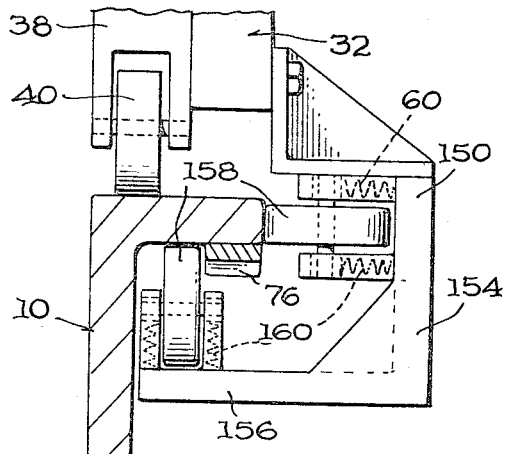
FIG. 18.
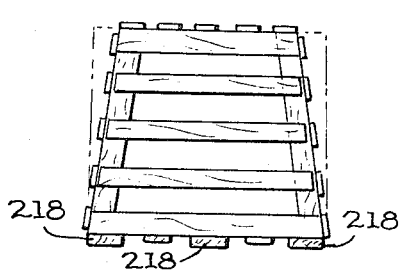
FIG. 23.
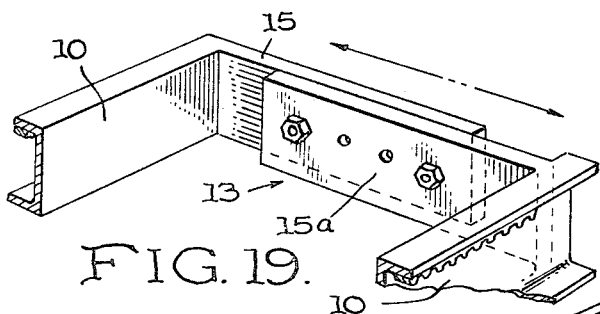
FIG. 19.
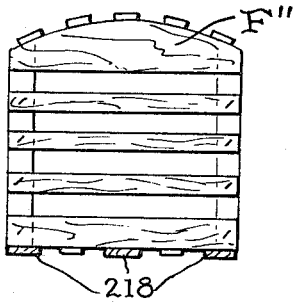
FIG. 24.
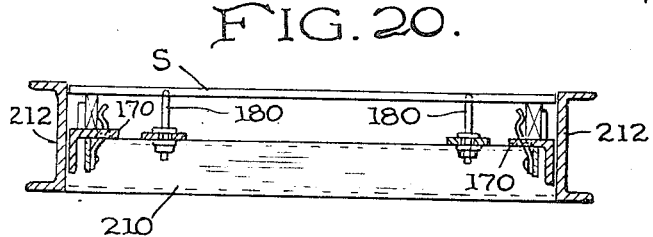
FIG. 20.
FIG. 25.
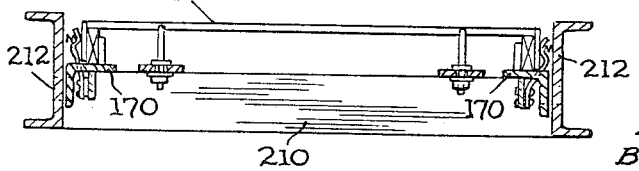
FIG. 21.
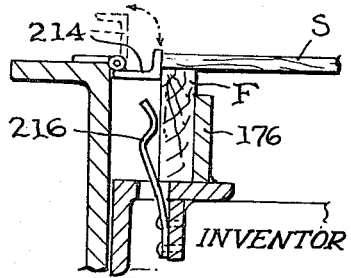
FIG. 22.
INVENTOR
LEO M. HASKINS
BY Eric P. Schellin
ATTORNEY

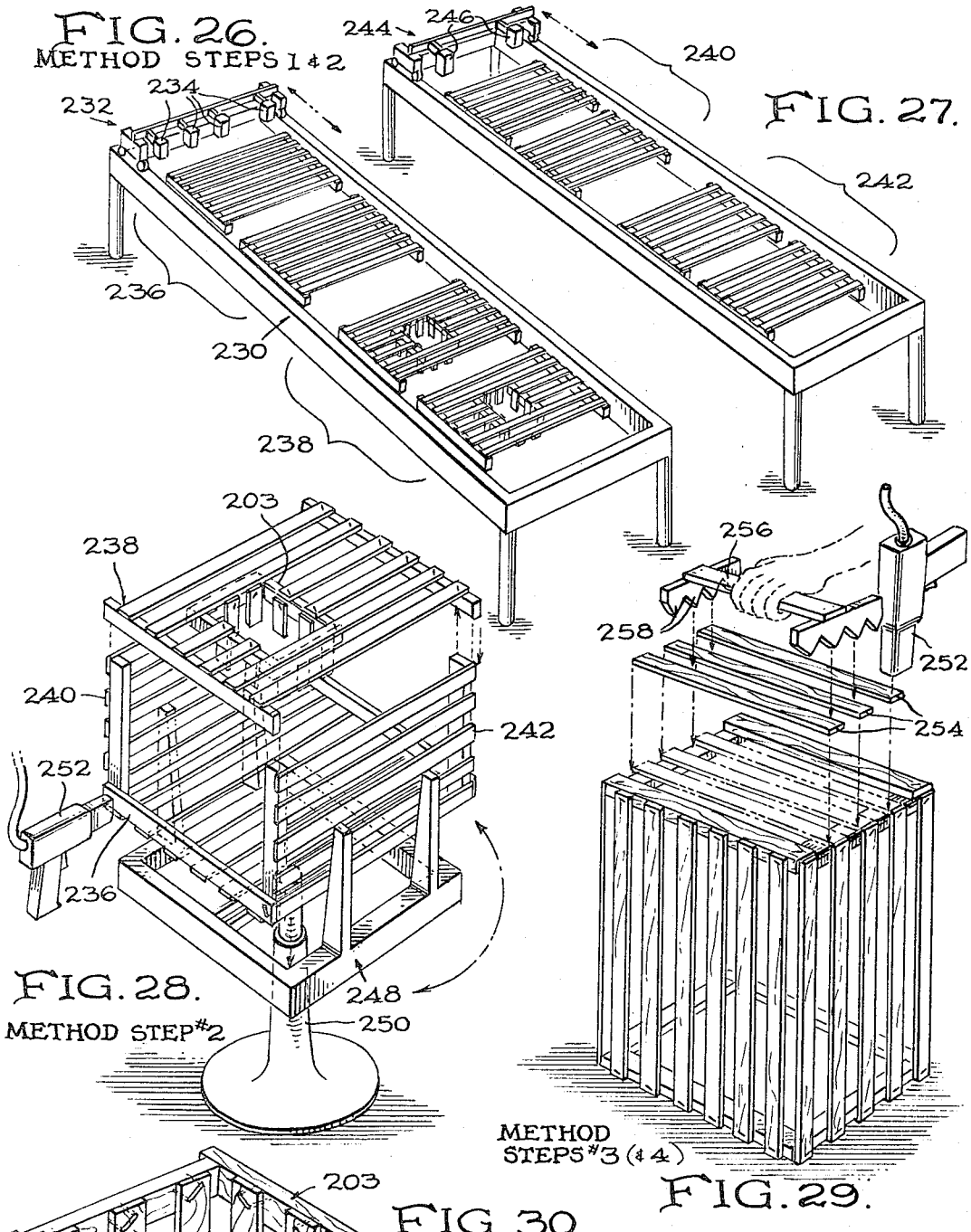

United States Patent Office 3,381,870
Patented May 7, 1968

3,381,870
AUTOMATIC NAILING AND STAPLING MACHINE
Leo M. Haskins, 1400 Washington St., Key West, Fla. 33040
Filed Apr. 28, 1967, Ser. No. 634,604
5 Claims. (Cl. 227—3)

ABSTRACT OF THE DISCLOSURE

An automatic nailing or stapling machine comprising in combination an elongated table means for supporting a plurality of different work components to be fastened together; selective adapter jig means longitudinally attachable to said table means for removably retaining the work components in a predetermined intersecting assembly relationship; carriage means mounted on said table and including selective drive means associated therewith for effecting longitudinal two way travel of the carriage along said table; automatic fastener means adjustably mountable in association with the carriage means both above and/or below said work components on the table means for effecting automatic fastening together of the pre-arranged work components responsive to predetermined travel of the carriage over said work components; and means for automatically discharging the completely fastened work components from said machine.

STATEMENT OF INVENTION

This invention relates to an improved automatic nailing and stapling means comprising a plurality of stapling mechanisms adjustably mounted upon a movable carriage, said carriage being adapted to traverse a longitudinally extended, work supporting frame or table adaptable to receive a plurality of different work pieces to be stapled or nailed together during the construction or fabrication of various types of articles. The articles may be made of wood or other material which readily lends itself to industrial use, for example, in the making of such items as lobster traps, picket fences, prefabricated wall panels or house sections, and industrial loading pallets and the like.

The invention further contemplates novel contact triggering means for activating the automatic nailers and/or staplers, and means including spring loaded means in conjunction with the mounting of the nailers that will componsate for variations in the thickness of the wood pieces being worked upon in successive nail driving operations. The machine further contemplates the provision of automatic nailing or stapling mechanisms carried by the movable carriage both above and below the work supporting table whereby when the carriage is activated for a given run, a complete nailing or stapling of a plurality of articles such as industrial loading pallets, wall panels, lobster trap components, or fence sections is achieved.

The invention further contemplates the use of a plurality of such machines disposed in side by side relation whereby, for example, the tops and bottoms of a particular article to be manufactured such as a lobster trap, may be fabricated on one of the machines while a plurality of the side panels or sections of said lobster traps are being fabricated on the other of said machines. Upon the fabrication of said individual panel members, responsive to a given pass of the carriage carrying the stapling means thereon, said completed members may be manually removed or automatically discharged from the work supporting tables and are replaced with new frame and slat members preparatory to effecting a reverse run of the carriage during which the subsequent fabrication of a like number of panels or articles is readily achieved. The work pieces, in the form of individual panels or sections, which have been completed during the first mentioned run, are then collected either manually or by automatic conveyor means and placed in a supply storage area from which the assembly workers select, for example, a bottom and top and two side members of the trap components which are preferably positioned on a further work supporting table or jig in a predetermined assembly formation as seen in FIG. 28, whereupon the frame members are stapled or nailed together to complete the basic box-like structure comprising the lobster trap, except for the end members. This sub-assembly is subsequently removed from the latter work supporting table and preferably placed on one end, thereby exposing the opposite open end to the workmen. A workman subsequently takes a plurality of presized slat members adapted to close said open end and places them approximately in their correct position, and by use of a hand held spacing jig placed thereupon the appropriate finished position is determined. By means of the automatic stapling device, which is in this instance manually held, the worker can readily staple said slats to the respective header members of the end frame. The same procedure is repeated for the opposite end of the box to complete a given trap.

Accordingly, it is apparent that a novel method of assembling various articles such as lobster traps and/or industrial loading pallets, picket fences or picket fence sections, and the like is readily attained hereby.

OBJECTS OF INVENTION

One of the principal objects of the invention is the provision of a novel and improved apparatus comprising automatic nailing or stapling means adjustably carried by a movable carriage over the supported work members adapted to be fixed in precise position whereby more accurate finished work pieces may be fabricated with substantially less chance of waste due to unacceptable tolerance variations which frequently result from when the work pieces are movably advanced beneath fixed nailing or stapling means.

It is another primary object of the invention to provide an improved automatic nailing stapling machine having a fixed work supporting frame and with movable stapling or nailing means associated therewith adapted to traverse said work frame, said work frame including means for adjustably interchanging adapted plates or jigs of various kinds to facilitate the making of various articles of manufacture, such as loading pallets, lobster traps, picket fence sections, prefabricated wall panels and the like.

A further object of the invention is to provide an improved combination of the aforementioned character wherein the advancement of the automatic stapling heads is manually controlled by switch means while the stapling operation attendant therewith is powered by pneumatic means under automatic control.

Further objects and advantages of the present invention reside in the details of construction of its parts in their assembly or combination and in the mode of operation and control of the mechanism as will hereinafter be fully described and which will be apparent to those skilled in the art to which it relates.

In accomplishing these and other objects, I have provided the improved details of construction in conjunction with preferred forms of the invention which are illustrated in the accompanying drawings forming a part of this specification.

FIGURE DESCRIPTION

FIGURE 1 is a top plan view of a preferred form of my improved automatic nailing and stapling machine as set up to fabricate industrial loading pallets and the like.

FIGURE 2 is a fragmentary side elevation view of FIGURE 1 with certain portions broken away and in cross sections.

FIGURE 3 is a fragmentary perspective view on an enlarged scale, partially in cross section and looking into one end of the machine of FIGURE 1 and showing details of the carriage assembly associated therewith.

FIGURE 4 is a perspective view of a major portion of the work supporting table of FIGURES 1 and 2, showing various stages of a plurality of work pieces in assembly and in partially exploded fashion to illustrate the manner in which they are placed upon the work table preparatory to being automatically stapled or nailed together by the stapling means carried by the carriage means, the latter of which has been omitted for purposes of clarity in this figure.

FIGURE 4a is a perspective of a spacer pin detail.

FIGURE 5 is a fragmentary perspective detail showing one form of adjustability means for mounting of the automatic nailer or stapler heads.

FIGURE 6 is a detailed perspective view of a spacer bar used in conjunction with making of the pallet articles.

Figure 6A:
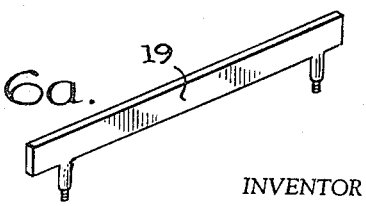

FIGURE 6a is a perspective detail view of a slat guide member.

Figure 7:
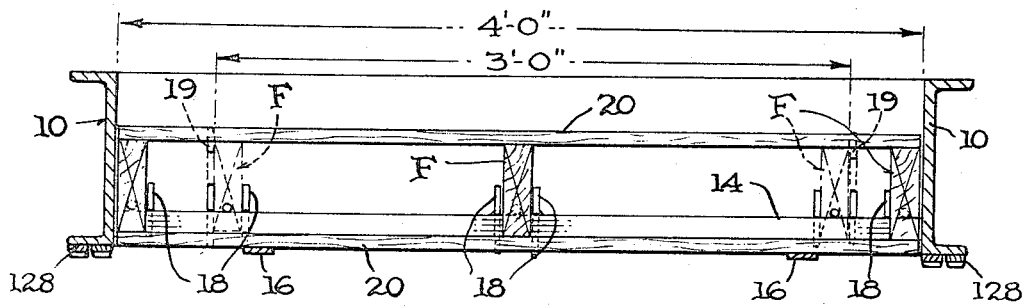

FIGURE 7 is a typical enlarged cross-sectional detailed view through the work supporting table of FIGURE 1 and showing the pallet component members in their respective relationships preparatory to being nailed together.

Figure 8:
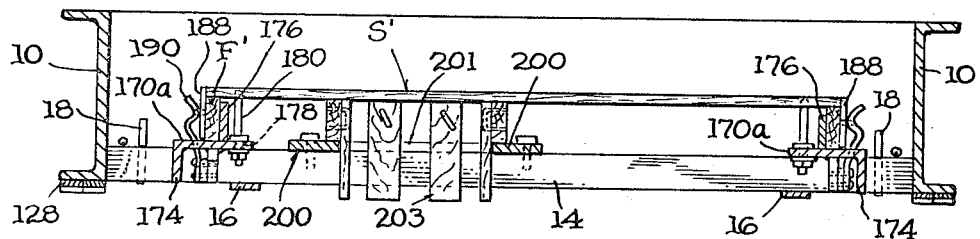

FIGURE 8 is also an enlarged cross-sectional view, similar to FIGURE 7, but showing the work supporting table with a plurality of adapter jig pieces associated therewith for making the top sections of lobster traps.

Figure 9:
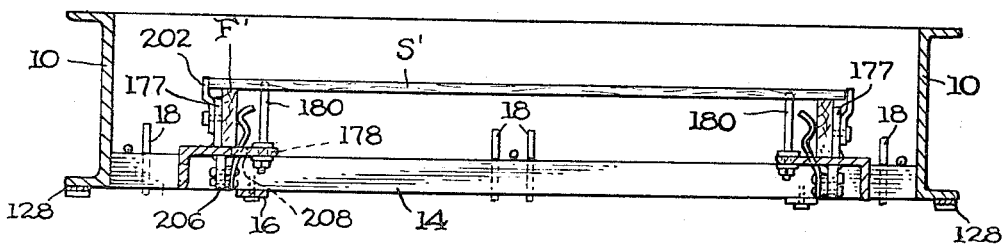

FIGURE 9 is an enlarged cross-sectional view similar to FIGURE 8 showing the work supporting table adapted with jig pieces for making the sides of the lobster trap.

Figure 10:
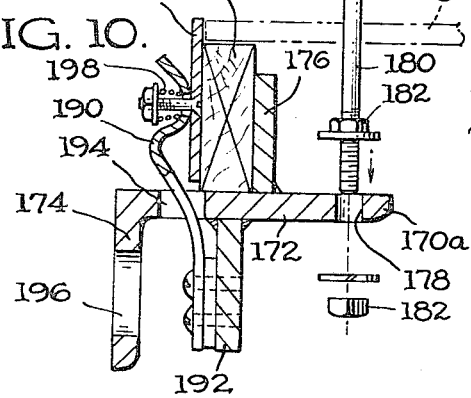

FIGURE 10 is a further cross-sectional detail view on an enlarged scale of spring holding and spacer means used in conjunction with the fabricating of the lobster trap side and top sections.

FIGURE 11 is a top plan view of my improved work supporting table and adapter jigs in place for making lobster trap sides, with the stapler and supporting carriage being omitted for clarity.

FIGURE 12 is an enlarged fragmentary cross-sectional detail view taken on the line 12, 12 of FIGURE 11, more clearly showing the relationship of the jig adapter members to the work table members and showing the relationship of the workpiece holding and spacing means associated therewith.

Figures 13, 14:
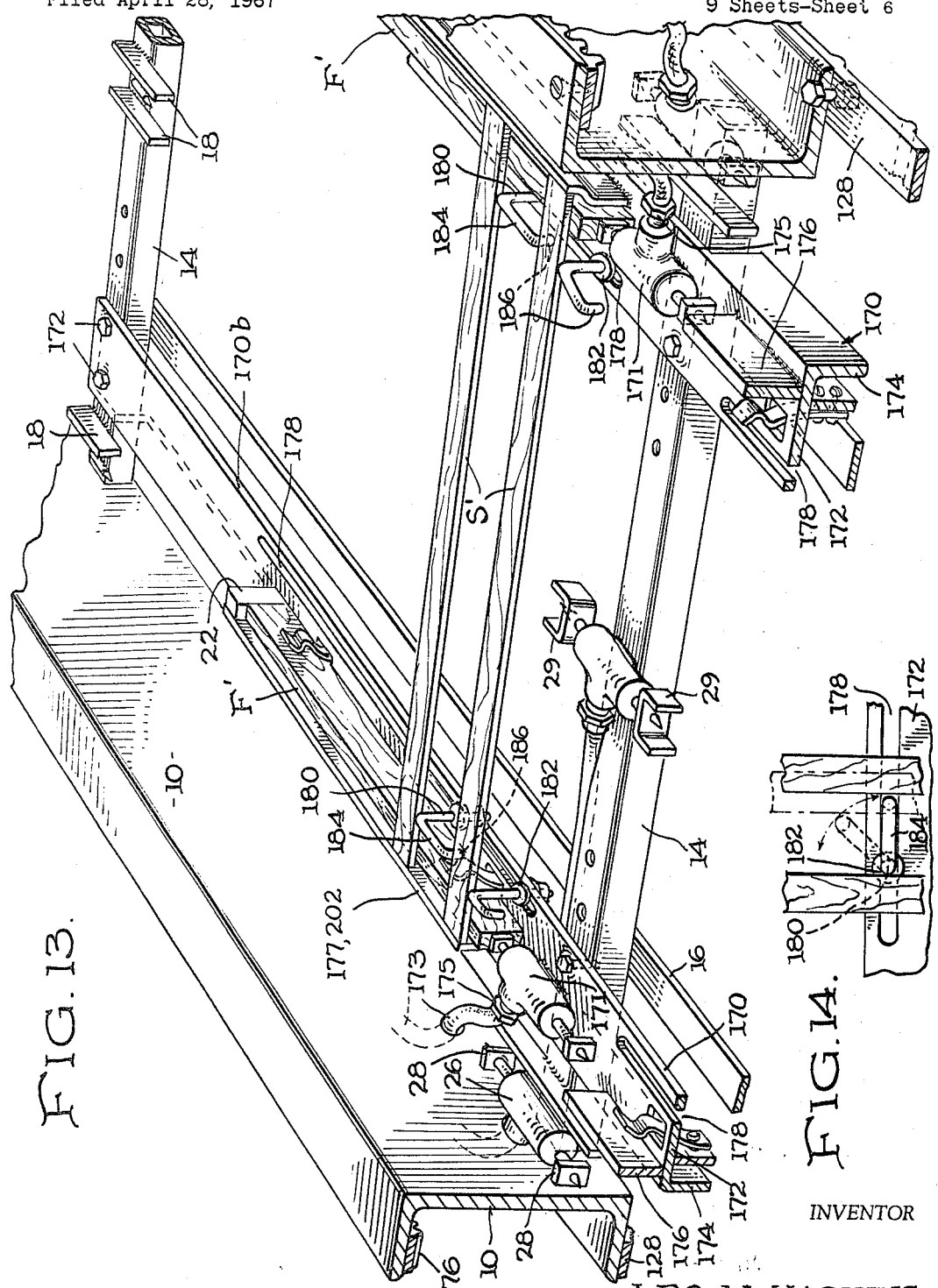

FIGURE 13 is an enlarged fragmentary perspective view better illustrating the detailed relationship of the jig members used in conjunction with and as attached to the basic work table for making lobster trap bottom sections.

FIGURE 14 is a fragmentary top plan view of a detail of the spacer mounting means which enables the slat members to be varied in their spacing according to predetermined requirements of the particular article being made.

FIGURE 15 is an enlarged detail side elevational view of the carriage and cam actuated means carried thereby, said means being used to trip the automatic staplers and/or nailers carried by the said carriage.

FIGURE 16 is an end view of the means shown in FIGURE 15 and as viewed on line 16, 16 thereof.

FIGURE 17 is a detail perspective view of the resilient adjustment means for compensating for variations in thickness of the work pieces, with a portion of the spring shown broken away.

FIGURE 17a is a detail view on a smaller scale, shown partially in side elevation and partially in cross section, of the resilient mounting means of FIGURE 17.

FIGURE 18 is an enlarged detail view of roller guide means used in association with the carriage means.

FIGURE 19 is a fragmentary perspective detail view of a modified construction providing adjustment means for varying the width of the work supporting table.

FIGURE 20 is a fragmentary cross-sectional detail view of a modified embodiment of the invention and depicting a machine for making lobster traps or picket fence sections only, in contrast to that of the machine shown in FIGURES 1–7 which are adapted to make both the pallets and the lobster traps among other things; said FIGURE 20 illustrating the adjustable jig members positioned for making lobster trap side members only.

FIGURE 21 is a fragmentary cross-sectional detail similar to FIGURE 20 but depicts a slightly modified jig means adapted to make the tops and bottoms of the lobster traps, instead of the side members.

FIGURE 22 is an enlarged detailed cross-sectional view showing a work frame holding jig member in association with alternate means for effecting predetermined accurate slat positioning.

FIGURE 23 is an end view illustrative of a different shaped lobster trap having inclined side panels as viewed from the end thereof.

FIGURE 24 is illustrative of still a different shaped lobster trap embodying a curved top section.

FIGURE 25 is a fragmentary detail view showing the curved track section of a modified form of work supporting bed over which the carriage member carrying the automatic nailing means would traverse during the making of the lobster trap having a curved top section as depicted in FIGURE 24.

FIGURE 25a is a fragmentary view partially in cross section and partially in elevation depicting a modified embodiment having means for automatically discharging the completed work component from the work supporting table and conveyor means for receiving and conveying said completed components away from the machine.

FIGURES 26 and 27 are perspective views schematically illustrating a machine for respectively making a plurality of tops and bottoms of lobster traps (FIGURE 26) and for making a plurality of side members (FIGURE 27).

FIGURE 28 is a perspective view illustrating the assembly of the top, bottom and two side members comprising the basic structure of the lobster trap fabricated in accordance with this invention.

FIGURE 29 is a perspective view showing the next step in completing the fabrication of a lobster trap after it leaves the work support table of FIGURE 28, said step shown herein being illustrative of one preferred way of completing the end assembly of said lobster traps.

FIGURE 30 is an enlarged detail view of a prefabricated lobster trap door frame for use in association with making the top sides of the lobster traps.

Referring specifically to the drawings and more particularly the embodiment of FIGURES 1–7, the invention as there shown as comprising my automatic nailing machine for fabricating industrial loading or supporting pallets. The machine comprises a work supporting frame or bed designated generally at A and an automatic nailing or stapling carriage supporting means designated at B and including motor and drive means C and D respectively.

The work supporting frame means A comprises a main frame or table preferably formed of structural elements such as metallic channel members 10 and 12 disposed in spaced apart relation to form a pair of longitudinally extended side members 10, 10 and a pair of opposed end connecting members 12, 12. A plurality of intermediate interconnecting frame members, which may be in the form of box beams 14, are disposed at predetermined spaced apart positions as shown in FIGURES 1 and 2, said beam spacing being essentially dictated by the overall general size desired of the pallet members to be made therein and as schematically indicated by the phantom X-shaped outline designated as P. The spacing between the side members 10, 10 is dictated preferably by the maximum size of the pallet to be made on this particular machine, said size usually being 4 feet square. A pair of longitudinal stringer members 16, 16 are affixed to the bottom of the transversely disposed members 14 and are spaced inwardly from side members 10, 10 sufficiently to support the pallet slat members 20 for both the four foot and narrower three foot size pallets as more clearly seen in FIGURE 7. The longitudinal members 16 may be either removably and adjustably attached by suitable screw fasteners S (FIGURE 4) or may be more permanently attached as by welding.

The members 16 are further provided with a plurality of preferably equally spaced slat spacer members 17 shown in FIGURES 3 and 4, which may be permanently welded, or which may be removably affixed as by depending pins 17a insertable into correspondingly provided adjustment apertures 17b.

While the illustrative drawings depict a work supporting frame long enough to permit the fabrication of only four pallet members (FIGURE 1), it is to be understood that a larger plurality may be accommodated by simply providing a longer frame support, as factory space limitations permit.

To aid in the fabrication of the pallets, a plurality of positioning plates 18 are attached to the beams 14 at predetermined places, better seen in FIGURES 1, 3, 4 and 7 to facilitate correct longitudinal orienting or positioning of a predetermined plurality (usually three) of pallet head frame pieces F. The frame pieces F are usually precut to uniform length from suitable 2 x 4" woodstock. Positioning plates 18 may also be removably and/or adjustably affixed to their respective transverse frame members 14, better seen in FIGURE 3, wherein suitable pins 18a depending from plates 18 are adapted to mate with correspondingly provided apertures 18b. The plates 18, where used in spaced relation from but relatively adjacent the longitudinal table members 10, will be used singly to define the thickness of the 2 x 4 frame member, in cooperation with the inner face of said members 10 acting as the other abutment or positioning means. Where the bars 18 are attached in the center of the framework, they are used in pairs; and, because these centrally disposed bars 18 would normally remain fixed during fabrication of both the four foot and three foot size pallets respectively, the said bars may be welded if desired as at 18c in FIGURE 3.

In the course of making said pallets, a predetermined plurality of transversely disposed, wooden slat members 20, usually five as illustratively shown, for each of the pallets, are initially laid into the table frame upon the longitudinally extended supporting members 16, said members being properly spaced by the spacer members 17. In the present instance of fabricating the four foot pallet, it will be observed that the precut slats 20 fit nicely between the longitudinal bed frame members 10, the latter of which inherently serve as side guides therefor during the placement therein of the lower plurality of slat members 20. The three longitudinally disposed 2 x 4 header frame members F are subsequently placed in their respective positions, with two being disposed adjacent the outer frame members 10 and one disposed centrally therebetween, by the aid of plates 18 as clearly shown in the drawings. A like plurality of slat members 20 are positioned transversely to and upon the frame members F to complete the pallet sandwich. Commencing at the end of the bed shown in FIGURES 3 and 4, a slat abutment member 22 preferably is affixed to the respective side frame members 10 adjacent the end positions of the 2 x 4 frame members F. These abutments would be thusly mounted above alternate transverse frame tie member 14 as clearly shown and for a reason to be further clarified. Using the end abutment lugs 22 for the initial longitudinal spacing of the end slats 20, the rest of the slats are maintained in their respective longitudinally spaced positions by means of one or preferably two space bar members 24, shown in perspective detail in FIGURE 6, said bars 24 merely being laid upon the top slats 20. It will be understood that said bar spacers also serve to firmly weigh down the respective slat members 20 during their subsequent nailing operation.

Another feasible means for spacing the slats would be to provide spacer pins 17c, as per FIGURE 4a, having a stop shoulder adjacent the lower end and adaptable to be inserted into the appropriate spacer pin holes provided in strap members 16. The pins 17c would be just tall enough, when assembled, to be substantially even with the top surface of the top slats.

To facilitate the correct and rigid positioning of the frame members F, there are a plurality of pneumatic or hydraulic ram assemblies 26 disposed intermediate the aligned ends of each of spaced frame members F on the alternate cross members 14 more clearly shown in FIGURES 1, 2 and 4. It will be observed that the said rams 26 are of the double acting type in which actuating fluid is introduced preferably medially of the cylindrical housing between opposed pistons housed therein. Extending from each piston from opposite end of the housing are piston rod members which have plate members 28 mounted on their respective external ends for the purpose of engaging the respective ends of frame members F responsive to the introduction of the actuating fluid into the ram cylinders. Each of the plates 28 preferably has a centrally disposed point or detent 30 projecting a short distance beyond the plate for the purposes of slightly impaling the frame members F, thus serving to better or more firmly position the same in the work table. The centrally disposed rams are provided with preferably different, U-shaped bracket or plate members 29 (FIGURE 4) for engaging the frame members F on their respective opposite end extension, said U-shaped brackets serving to better orient and maintain the central 2 x 4 frame members in position with respect to the rest of the pallet frame components. The ram assemblies are preferably removably attached to the cross beams 14 in their respective positions, as by depending mounting bolts or angle brackets not shown.

After the pallet frame components have been properly positioned in the work supporting table, they are then ready for the passage of the automatic nailing means carried by the carriage means B, which construction and operation thereof will now be described in more detail.

The carriage means B comprises a pair of bearing blocks 32, 32 disposed in opposed relationship but rigidly interconnected by means of a horizontally disposed plate member 34 and a vertically disposed plate member 36, as better seen in FIGURE 3. The bearing blocks 32 are spaced apart a distance corresponding essentially to the width of the work supporting table A, and have roller means 38 affixed to each of the bearings 32, 32. The roller means 38 include rollers 40 which are adapted to rollingly engage on the top flange of siderail members 10. The drive motor M and gear reducer means C may be supported in any suitable manner on the carriage. One suitable way, as shown in FIGURE 3, illustrates the motor M adjustably supported or mounted upon a plate 42 which is disposed above the carriage cross-members 34 and 36 by suitable support means 44 attached to either of members 36 or 34. Preferably disposed therebeneath and upon the transverse plate 34 is an appropriate gear reducer means 46. The motor M is preferably of the type having a magnetic or other positive braking means in association therewith whereby when the motor is deenergized, the output shaft 48 and its attached drive pulley will come to an immediate halt. The output pulley is drivingly connected by means of a flexible drive belt 50 and driven pulley 54 attached to the input shaft 56 of the gear reducer C. The gear reducer C is provided with appropriate output shafts 58 at each side thereof and to which are connected, by means of couplings 60, a pair of horizontally disposed shafts 62, which are supported adjacent their outer end thereof within the bearing block members 32, 32. Additional bracket means 64 (FIGURE 3) are attached to each of the bearing means 32, and, as shown, depend therefrom outwardly of the frame members 10 for the purpose of supporting part of the carrage drive gear means to be described and also another transversely disposed mounting bracket means 66 for the purpose of mounting additional fastener gun means to be described in detail hereinafter. The exemplary drive gear means is illustrated as including a relatively large spur gear 68 fixedly attached to each end of the shafts 62, 62, said gear 68 drivingly engaging with the substantially smaller spur gears 70, 70, supported on shaft means 72 carried by the additional bracket means 64 aforesaid. Affixed on the inner side of the bracket 64 and on the end of shaft means 72 opposite to that of gear 70, there may be provided a somewhat smaller diameter or same size diameter driving gear 74 which meshes with a complemental gear rack means 76 provided on the under side of the top flange of side members 10.

The gear ratios and gear reducer and motor drive means are complementally coordinated to provide a drive speed of approximately one foot per second. It is to be understood that other gear sizes and drive arrangements may be provided whereby, for example, only the equivalent of the spur gear 68 may be used, said gear and associated drive means being such that it would intermesh directly with appropriate gear rack means disposed on the upper side of the top flange of members 10.

Accordingly, it will be understood that when the drive motor M is energized, the output thereof will initiate the drive gear train with the result that drive gear 74, due to its interengagement with the associated rack means disposed with each member 10, will effectively drive the carriage. The carriage, rollingly supported on roller members 40, will traverse the longitudinal length of the table or bed member A until the predetermined run has been completed, whereupon the carriage or its depending bracket 64 engages a limit switch means 78 (FIGURE 1) mounted at the far end thereof, said limit switch means 78 serving to deenergize the drive motor M, whereupon the magnetic or other brake means associated therewith instantly stops the drive means thereof with the attendant instant cessation of the carriage movement. Upon subsequent rerunning of the carriage in the opposite direction, a similar limit switch means 80, disposed at the end of the work-support table A, as shown in FIGURE 3, will similarly stop the movement of the carriage at a predetermined time. A suitable protective cage, not shown, is utilized to enclose the drive gear means of the machine.

A suitable start-stop and reversing switch means 82 is provided in a readily accessible location, such as mounted on an upper extension means of the support members 44 carried by the carriage. Also carried by the carriage are the automatic nailing and/or stapling means in the form of conventional, commercially available stapling or nailing guns designated G. As better seen in FIGURES 3 and 5, said guns are carried on adjustable bracket means designated 84 disposed on the transversely extended carriage member 36. The bracket means 84, in one illustrative embodiment, comprises a form of vertically flattened C-clamp 86 adapted to slidably engage bar 36 and having said screw means 88 disposed in the opposed free leg of the C-clamp. Secured to the bight portion of the C-clamp and projecting therefrom is a T-shaped mounting bar 90 which extends downwardly a sufficient distance within the open table-frame to accommodate vertical adjustment of the individual guns G. Said guns are carried within a supporting strap or bracket 92, which, in turn, is attached to another C-bracket 94 which slidably engages the top web of the T-bar 90, as clearly shown in FIGURE 5. Screw means 89 similar to those shown at 88 are also used in association with C-bracket 94 to lock said clamp in predetermined position and thereby position the guns in their correct elevation relative to the bed supported work members to be fastened together. Lateral adjustment of the guns is accomplished by sliding of the bracket means 94 across the carriage bar 36 until the appropriate position is determined, whereupon the screw locking means associated therewith are utilized.

The guns G, which are operated by air or other fluid pressure in the conventional manner to effect the driving of a staple or nail fastener, are actuated according to predetermined need by triggering means 96 carried in depending form from at least one side of the carriage, shown clearly in FIGURES 15 and 16, but omitted for clarity purposes in the other figures. The said triggering means 96, as illustrated in FIGURES 15 and 16, and the angle bracket 98 have adjustable mounting means 100 for varying the vertical position of the rest of the components to be described. Carried at the lower end of the bracket 98 and projecting laterally inward beneath the side rail 10 is a bearing block 102 affixed to said bracket 98. Integrally formed with and depending from said block 102 is a bracket arm 104 on which is pivotally mounted an actuating lever 106 as clearly shown. The pivot or fulcrum point of lever 106 is such that an approximately 1:3 ratio is obtained. Lever 106 is provided with horizontally disposed flattened ends, the innermost of which is engaged by a cam actuating finger 108 vertically and slidably disposed within an accommodating aperture formed in block 102. A resilient expansion spring 110 encircles the lower end of pin 108 and is interposed between the lower surface of block 102 and the innermost end of lever 106. The outermost end of lever 106 is disposed in spring-loaded engagement with an actuating arm or rod 112 which is operable reciprocably to trip air valve means 114 as supportingly carried by bracket means 117 on the lowermost end of bracket 98 and in opposed spaced relation to bearing block 102. The cam engaging or actuating finger 108 is disposed in such a manner as to be engageable, one at a time, with a plurality of cam surfaces 116 provided in predetermined spaced apart relation on cam strips 118, which in turn are removably secured by fastening means 120 to the lower web of side frame member 10 of the work supporting table. It is understood that the spacing of the cam surfaces is determined by the predetermined point of fastening to be effected of the slat components with the frame members of the article being fabricated. Accordingly, when the carriage, carrying the fastening guns and actuating means therewith, is driven along its track surface, as the nailing guns arrive at their prescribed position over the assembled frame member, the cam engaging finger 108 has already approached and is depressed by the cam surface 116 coinciding with said gun position. The said finger 108 thereby vertically actuates the lever 106 which, by means of a rod 112, activates the air valve means 114, thereby permitting a charge of air to pass through the flexible conduits attached with the respective guns in a conventional manner well known in the art, and which in turn drives the stapler or nail at the desired point. Upon passage of the finger 108 over and beyond a given cam surface 116, the spring 110 immediately causes the air valve means 114 associated with the gun to close until the next cam surface is reached, whereupon the same procedure is repeated over and over throughout the length of travel of the carriage along the work bed until a complete fastening run has been achieved.

While it may be preferable, in some instances, to have each of the guns operated responsive to a corresponding actuating means, for instance, one cam strip means on each side of the track or lower web surface of side members 10, it is to be understood that a plurality of guns and their actuating pneumatic lines could be arranged to operate concurrently responsive to the actuation of one set of cams and associated triggering means. Also shown in FIGURES 15 and 16 is a second triggering means 122, which is identical to that described in conjunction with 96, but which is carried on a separate mounting bracket 124 and is disposed in such a manner that its cam engaging finger 126 is aligned beneath another separate cam track 128 mounted adjacent the first-described cam track 118. With the provision of separate cam tracks and triggering means, it is understood that a second set of gun or stapling means may be carried with and below the carriage as aforesaid mentioned on crossbar 66. It is to be understood that one particularly desirable procedure requiring the simultaneous operation of a first and second set of guns would be in the fabrication of industrial pallets where both the top and bottom slats are secured simultaneously responsive to a single pass of the carriage and gun means thereover and therebeneath. The lower set of guns and their associated adjustable mounting means is generally indicated at 130 as shown in FIGURES 2 and 3. Furthermore, it is contemplated that the cams may be alternatively mounted along the side frame members other than on the underside of the bottom flange member, such as possibly on top thereof or adjacent the outer side thereof.

Referring now to FIGURES 17 and 17a, the means for compensating for variation in work slat thicknesses is achieved by modifying the gun mounting apparatus of FIGURE 5 by the interpositioning of a resilient spring mounting means. A vertically disposed mounting post 130 is attached in an offset manner by means of bar 132 from the C-clamp 86 which is laterally adjustable on the cross tie bar 36 as described hereinabove. Post 130 is provided with an externally threaded lower shank portion 134, an internally threaded upper portion 136, and an elongate vertical keyway 138 provided along a substantial portion of the post, as shown. A generally cylindrical bracket 140, having the gun mounting bracket or strap 92 attached thereto, is provided with a key which complementally rides on the post with key in said keyway 138. A lock nut 144, engageable in threaded portion 134, provides an adjustable mount of the gun bracket in a vertical plane. The fastener gun which is secured in bracket 92 is preferably provided with a beveled or rounded lower end portion which will engage and cam upward, over an excessively thick slat member, against the resilience of spring member which encircles post 130. The spring seats at the lower end upon the cylindrical slide bracket 140 and at the upper end against the underside of the head of adjusting screw 148 which is adjustable within threaded recess 136 and provides means for varying the spring tension. A lock nut 145 cooperates with screw 148 to effectively set the same.

Diverting to FIGURE 18 temporarily, there are disclosed details of supplementary spring loaded guide roller means which may be used in connection with the carriage to facilitate positive and true travel throughout the length of the work table and track means, irrespective of attendant vibration due to firing of the guns. The illustrative form shown comprises an irregular shaped bracket 150 attachable to the carriage by suitable means 152, a main vertical section 154 and a horizontally disposed section 156, on which of each is mounted an auxiliary roller 158, disposed in a conventional spring loaded manner generally indicated at 160. This arrangement will preclude any tendency of the carriage to deviate from its intended course of travel, particularly throughout extended work table lengths.

The particularly work supporting table previously disclosed is intended to be used for making pallets of the 4-foot and 3-foot size, as well as adapted to receive jig adapters, to be described hereinafter, to facilitate the fabrication of a different kind of flat work such as lobster trap sides and/or tops and bottom panels. As briefly described hereinabove in connection with FIGURE 7, when it is desirable to fabricate industrial pallets of the 3-foot size, it is only necessary to reposition the frame aligning plate members 18 as shown in FIGURE 7, with the center aligning guide means 18 remaining the same. To facilitate relatively rapid alignment of the slat members 20 for use in making said 3-foot pallets, modified alignment plates 19, shown in FIGURE 6a, are preferably used in place of one of the other plates 18. Modified plate 19 comprises an elongated strip extending the length of one of said pallet members and having depending mounting pins at each end thereof, with the understanding that said extended plate body will have sufficient height or be disposed on mounting pins at a height sufficient to enable the transverse pallet slats to abut thereagainst for alignment purposes. Upon the correct positioning of the predetermined slats and frame members necessary for making such a pallet, the carriage means together with the guns, and particularly the laterally disposed guns having been preadjusted to effect nailing of the narrow 3-foot pallet, is activated and the carriage traverses the length of said work bed and achieves the prerequisite nailing from the top and bottom slats simultaneously.

At the completion of said run, the work table is emptied of the completed pallets and subsequently replenished with the appropriate slat and frame material, whereupon a reverse run of the carriage is effected by the operation of said reversal switch 82 and the carriage accordingly traverses the length of said work bed until it is stopped at the opposite end once again by said aforedescribed limit switch 80.

When it is desired to use the same equipment, that is, the same work supporting table and carriage with attendant nailing and fastening stapler means, for fabricating other than the industrial pallets aforedescribed, a variety of such articles would qualify for fabrication therewith, including picket fence sections, wall stud and panel section, and the like. However, a preferred article and embodiment use would be that directed to the fabrication of lobster trap panels, now to be described in more detail.

To accomplish a transformation from the pallet making machine to the lobster trap making machine or work table support, suitable adapter jig members designated 170, and preferably fabricated of metallic angled stock material or other suitable rigid material, are disposed longitudinally inwardly adjacent the side frame members 10 and rest upon the transverse cross beams 14. The beams 14 are suitably apertured to receive jig mounting screws or bolts. Accordingly, it is apparent that the said jig adapters are adjustably mounted according to the particular size of panel being fabricated.

The said adapter jigs 170 are of a length to span at least one set of cross beams 14 and, more preferably, span a plurality thereof, as shown in FIGURE 11. Said jigs preferably comprise a widened top flange 172 as compared with a lesser dimensioned angularly depending flange 174. For each desired panel member to be fabricated, there is provided an upstanding frame guide member 176, better seen in FIGURES 8 and 10. The general adapter jig members 170 will vary slightly for use in making the tops and bottom panels of the trap as compared with that adapter used for making the side panels of the traps. FIGURE 8 is illustrative of the adapter used for making the trap tops and bottoms, with FIGURE 10 being an enlarged fragmentary detail thereof. FIGURES 9, 11, 12 and 13 more clearly depict the adapter jigs used in conjunction with making the trap side panels.

Proceeding with the description of the jig of FIGURES 8 and 10, said jig is designated 170a and further includes an elongated slot 178 spaced laterally inwardly from the upright guide 176. The slot 178 is for the purpose of accommodating a plurality of spacer pins 180 which are used to space the slat members, to be described in detail hereafter. Each of the spacer pins 180 is preferably fabricated of a rod stock material threaded at one end to receive complementary threaded adjustment nuts 182. The shank of said pin adjustably extends upwardly a predetermined height according to the particular frame with which it is to be associated, and then bends laterally as indicated at 184 for a distance equal to the maximum desired spacing between slats with which it is associated, and preferably subsequently bends downwardly terminating in a short end 186. FIGURE 14 is illustrative of the use of the spacer pin wherein the showing in solid lines is indicative of a maximum spacing of the slats, whereas the showing in dotted rotated position depicts a condition whereby a closer spacing of the slats is afforded. The bent down end will provide a tolerance to assure abutment with a related slat in the event the height of a given spacer pin or slat thickness have not been exactly coordinated.

Continuing with the description of adapter member 170a, there is associated therewith a resiliently mounted holding plate 188, FIGURES 8 and 10, comprising an elongated body corresponding in length generally to that of frame guide member 176 and at least as long as the header frame F' which is inserted in place in the jig between the upright guide 176 and the holding plate 188. It is noted that the plate 188 projects above the frame F' equivalent to the thickness of the slats S' which abut thereagainst as better seen in FIGURE 10. Plate 188 is resiliently mounted to the jig member 170a preferably by a plurality of springs 190 removably attached to a depending web portion 192 affixed to the lower surface of jig member 172. Appropriately disposed adjacent 194 are provided in web 172 to accommodate the spring 190 and another aperture 196 is provided adjacent thereto in web 174 to facilitate attachment of the spring 190 to web 192 by means of screws or other appropriate fasteners. A togglelike, spring-loaded connection indicated at 198 is used to effect the connection between the spring 198 and the plate 188 to permit the plate 188 to yieldably tilt during the insertion of frame F' therebetween. It will be apparent that the action of the springs 190 will serve to hold the frame F' in its desired position within the jig. The opposite hand side is of the same construction but merely reversed from that described hereinbefore.

In addition to the aforedescribed jig members 170a which are utilized in the making of the top and bottom panels of the lobster traps, additional jig bars 200, having transverse bars 201 interconnected with the bars 200, thereby defining a generally square opening for predetermined positioning of the prefabricated lobster trap door frame 203 shown in FIGURE 30, are necessary for use when making the top trap panels. The prefabricated door frame 203, which is self-evident in construction as shown in FIGURE 30 and as shown in cross section in FIGURE 8 mounted between jig members 200, is suitably positioned so that the slats S' are automatically nailed to said door frame headers as well as to the end of side frame headers F' responsive to the operating travel of the carriage and four automatic stapling or nailing guns carried therewith.

With respect to the jig attachments of FIGURES 9, 11, 12 and 13, as used in the fabrication of the side panels of the lobster traps, it will be noted that the frame guide member 177 is disposed on the upper web 172 of adapter jig 170b in a somewhat laterally displaced position and terminates in a laterally offset upper edge 202 which may be either integrally formed therewith or added as an auxiliary strip attached to upright 177. It will also be observed that the frame F', in this instance, is disposed on the side of the upright member opposite from that of its counterpart in FIGURE 8, and the holding spring means 204, without the previously associated toggle and plate connection, is mounted on the opposite side from that of its counterpart and attached to a depending web 206 through aperture 208, corresponding to components 192 and 194 respectively in the embodiment of FIGURES 8 and 10. The reason for the overhang of the slat S' beyond the frame member S' in the FIGURE 9 embodiment, as afforded by the offset portion 202 of guide 177, is so that these portions of the slats will overlie not only a portion of the frame members F of the tops and bottoms but also to afford a more uniform and flush mounting with the slats which complete the ends of the lobster traps and lie therebetween as shown more clearly in FIGURES 28 and 29 to be described hereinafter.

It is to be understood that, while the adapter plates 170a and 170b are shown with the spacer pin adjustment slots 178 integrally formed therewith, the top flange 172 could be narrowed and a separate plate means with a corresponding spacer adjustment slot be utilized. Also separate spacer plates or bars may be interchangeably utilized with fixed spacer pins provided in predetermined position thereon depending upon the particular article being fabricated.

Referring to FIGURES 11 and 12, it will be seen that the appropriate jig adapters 170 are in place, as supported upon the cross beams 14 and to which have been applied the end frames F'. Hydraulic or pneumatic ram means 171 similar to that described as 26 are provided and attached to the jigs 170 at positions corresponding to those of rams 26. They have the same general construction and serve the same function as rams 26 but upon the member 170. Flexible fluid pressure lines 173 are removably attachable as at 175 with said rams, to effect spreading action of the dual housed pistons having externally attached plates 177 for engaging the ends of the frame members F' over which have been placed the appropriate slats S', shown in phantom in FIGURE 11 and in solid in FIGURE 12, said slats having been spaced apart by means of the spacer pins 180. The header frames F' have been appropriately positioned and are maintained in longitudinal engagement with end stop members 22 by means of the ram 171 as aforedescribed.

In each of the aforedescribed embodiments pertaining to the fabrication of the tops or bottoms and the side panels, upon proper placement of the respective components, the carriage means with the associated automatic stapler means is activated. In this instance preferably a machine embodying only the upper set of guns or staplers is used, whereby traversal of the work bed or table by said carriage will result in the desired stapling of the slats S' to the frame members F' responsive to the automatic tripping or triggering of the stapler guns by the same cam and triggering means described relative to FIGURES 15 and 16. It is to be understood that the spacing of the cams 116 for use in securing the slats to the frame members in conjunction with the lobster trap application may be different from that associated with making the industrial pallets, and accordingly different cam strips may be required to replace those used hereinbefore.

Referring to FIGURE 19, there is shown a modification of the work supporting table wherein the longitudinal side frame members 10 are interconnected by laterally adjustable means designated generally at 13. Said latter means comprises a pair of complementally formed and apertured plates 15 and 15a respectively attached to the side members 10, 10 as shown. It is to be understood that other intermediate transverse connecting members corresponding to members 14 would be similarly adjustable. The plates 15 and 15a may be further provided with complementally formed key and keyway means for added strength.

Referring to FIGURES 20 and 21, there is fragmentary detail cross section of a suitably built work table designed primarily for the fabrication of items other than pallets, such as for lobster trap components and the like. It will be noted in these figures that the adapter jigs 170 are supported upon cross members 210, juxtaposed closely adjacent the side members 212 of the bed frame, whereupon said side channels may be used as the lateral or end guide for the slats, better seen in FIGURE 20.

The embodiments of FIGURES 20 and 21 would be equally adaptable for fabricating sections of picket fence, paneled wall or gate sections and the like. As an alternate to the toggle and spring mounted plate 188, 198 arrangement shown in the detail of FIGURE 10 for effecting correct position not only of the frame F' but also of the ends of slats S', reference should be made to FIGURE 22 wherein a hinged guide arm 214 may be affected as clearly shown to accomplish the same purpose. A spring 216 corresponding to spring 190 may or may not be used as desired in association with this embodiment of FIGURE 22.

FIGURES 23 and 24 relate to alternate shaped traps which may be achieved by prefabrication of the prerequisite panels on this machine. FIGURE 23 is representative of the tapered shaped trap in which the top of the trap is narrower than the base or bottom panel thereof. Additionally, the bottom panel is preferably made with heavy duty skid cleats 218 in lieu of some of the normal slat members. The means described in conjunction with the illustrative FIGURE 17 et al. relative to compensating for variations in slat thicknesses, will accommodate the nailing of said thicker slats 218 shown associate with the traps of FIGURES 23 and 24. FIGURE 24 illustrates a trap having a curved top which is sometimes preferred by fishermen. To fabricate this section, it would necessitate an alteration to the work supporting frame by the provision of arcuate track sections 220 embodied therewith as fragmentarily illustrated in FIGURE 25, and arcuately formed header frames F' with correspondingly modified adapter jigs to position same between the side frame members of the work supporting table. It is apparent to one skilled in the art that the same operation would be effective in fabricating this particular embodiment.

While the foregoing described embodiments represent actual and practical reductions to practice, a further and more sophisticated machine is contemplated which may embody means for automatically discharging the completed work piece from the supporting table, and conveying it to a storage area. This embodiment is fragmentarily depicted in FIGURE 25a wherein a plurality of work supporting jig frames 222 are hingedly disposed in normally horizontal position at spaced intervals and substantially flush with the transverse table connecting members 14a. Said frames 222 comprise any suitable skeletal framework members adaptable to support the work components to be fastened together, which in this illustration are represented as pallet components, and which are hingedly connected to the table frame as by means 224. Means 224 preferably includes spring, torsion bar or other suitable means which will normally return and/or maintain the jig frames 222 in their horizontal condition shown in dotted lines, when devoid of pallet or other work construction materials to be fastened together. Either manual or preferably automatic solenoid operated unlatching means 226, 226a are provided on the table frame and jig frame means respectively to releasably lock the jig frames 222 in their raised condition during preliminary loading and subsequent fastening of the work components in the general manner described hereinabove.

Further, at the completion of a given run of the carriage and fastener means operation, when the carriage engages either of the limit switches 78 or 80, in addition to said switch deactivating the carriage drive means, it is also wired to substantially simultaneously energize the plurality of solenoid operated unlatching means. The latter means may be in the form of an armature carried pin cooperable with a complemental recess 226a provided in the jig frames 222, whereby when the solenoid is activated the pins retract and the now pallet weighted jig frames drop by gravity to the inclined position about hinge means 224, as shown in solid lines.

A suitable conveyor means 228 is provided longitudinally beneath the jig frames to receive and convey away the completed pallet or other work piece being fastened together. It is understood that the pallets dislodge themselves by gravity down the inclined jig frames as they drop open, whereupon the pallets frictionally engage the continuously moving conveyor belt which draws them completely off of the frame. Once the pallets are cleared of said jig frames they are free to return to their closed condition, whereupon they are subsequently relatched, loaded with new work piece components to be fastened together, and a reverse run of the carriage-mounted fastener means is effected to complete the fastening whereupon the discharging and reloading cycle is again repeated.

Referring to FIGURES 26 through 30, the novel method attendant with this invention of making the exemplary article of lobster traps will now be described. FIGURE 26 is illustrative of a work supporting table designated 230 of the general kind aforedescribed in detail and representative of the type used for the fabrication of the tops and bottoms of lobster traps. The associated carriage designated 232 and having four guns designated at 234 mounted on said carriage is shown schematically at one end of the bed 230 preparatory to commencing a run traversing the length thereof. Also schematically shown on the frame are the frame header and slat components for making two bottom panels designated in the bracketed area 236, while the appropriate components for fabricating two top panels including the predetermined number of frame pieces, slats and door frame opening pieces, the latter shown in detail in FIGURE 30, are depicted within the bracketed area 238.

FIGURE 27 is representative of a similar work supporting frame, but having jig adapters thereon for making only the lobster trap side with two groups of two sides each being designated by the bracketed areas 240 and 242. The associated carriage designated 244 is provided with only two guns designated 246 inasmuch as only the ends of the slats are nailed to the frame members F down opposite sides of the work bed, as contrasted with the need for two additional guns in FIGURE 26 to achieve the nailing of the slats also to the trap door frame headers therein.

After the appropriate runs have been completed by the respective carriage means, thereby effecting fabrication of enough components for two basic lobster traps for the given run, the component panels may be removed from the respective work tables to a storage area or directly to the next station to be described. The supporting tables are subsequently refilled with the appropriate work components and a reverse nailing run of the carriage is effected, whereupon the cycle may be repeated indefinitely.

The next step, FIGURE 28, is the placement of a bottom panel 236, two side panels 240, and a top panel 238 within a secondary work supporting table or jig designated 248 which is rotatably mounted upon an appropriate stand 250 whereby the workman interfits the panels as shown in FIGURE 28 and fastens the frame pieces together by means of a portable but manually operated stapler gun 252 which may be of the same type as mounted on the carriage.

Subsequently, following this basic assembly of the lobster trap top, sides and bottom, it is necessary to close up the ends which is illustrated in FIGURE 29. As clearly shown, a predetermined plurality of precut slats 254 are then laid across the two opposed side frame members and in generally correctly spaced position corresponding to and preferably aligned with and between the overhanging ends of the medial slats of each of the side sections. A (hand held) spacing jig 256, having laterally disposed spacing teeth means of predetermined dimension, is then applied down over the slats 254 with the uniformly spaced teeth 258 interengaging between the three medially disposed slats 254 and the top and bottom header frame pieces to temporarily lock the slats positively in position prior to the stapling of each slat end to said frame pieces. The closing of both ends in this manner completes the assembly fabrication of the lobster trap. The traps are subsequently dipped in a creosote or other preservative and provided with an appropriate weight means preferably at one inside bottom end prior to being placed into active use.

From the foregoing detailed description it is apparent that an improved automatic nailing or stapling machine has been evolved which effectively achieves the objects and advantages set forth hereinabove.

While several specific embodiments have been illustrated and described in detail, still other variations and changes may be made by those skilled in the art without departing from the spirit and scope of the invention as defined in the appended claims.

I claim:

1. An automatic nailing or stapling machine for fastening a plurality of intersecting work components together in predetermined assembly relationship comprising in combination:
   (a) an elongated table means for supporting a plurality of the work components;
   (b) selective adapter jig means longitudinally attachable to said table means for removably retaining the work components in a predetermined longitudinal and lateral intersecting relationship;
   (c) carriage means movably mounted on said table;
   (d) selective forward and reverse drive means carried by said carriage and table means for effecting longitudinal two way travel of said carriage along said table length;
   (e) automatic fastener means including a plurality of fluid pressure operated stapling guns adjustably mounted in association with the carriage means in alignment with the intersection points of the work components; and
   (f) triggering means for automatically firing said guns at predetermined intersection points of the work components, said triggering means including longitudinally and selectively interchangeable spaced apart cam means on the table means and cam-engaging trip means on the carriage means.

2. The device as defined in claim 1 further including resilient mounting means in association with the carriage means for automatically compensating for variations in the thickness of various work components to assure proper fastening together thereof.

3. The device as defined in claim 1, wherein the table means includes longitudinal side frame members and transverse connecting members and means in association therewith for adjusting lateral spacing of the side frame members.

4. An automatic nailing or stapling machine as defined in claim 3, wherein:
   (a) the adapter jig means include work supporting frames hingedly attachable to the table means between the side frame members, said supporting frames being normally held in a horizontal closed condition when devoid of work components and when loaded with work components preparatory to said automatic operation of the machine;
   (b) complemental, selective latching and unlatching means disposed on the table means and on said jig supporting frames and operable to effect predetermined latching and unlatching of said jig frames at the completion of one way travel of the carriage means; and
   (c) conveyor means disposed beneath the jig frames to receive and convey away the completed work components responsive to completion of the fastening operational carriage travel in one direction and attendant discharge of said work components from the supporting table means.

5. An automatic stapling or nailing machine for fastening together a plurality of longitudinally and laterally intersecting work components comprising in combination:
   (1) a plurality of automatic fluid-actuated fastener guns, means for adjustably mounting a plurality of the fastener guns both above and below the work components;
   (2) means for actuating said fastener guns;
   (3) a longitudinally extended work supporting table means positioned below said fastener guns, said table means including a pair of longitudinally extended side frame members disposed in a laterally spaced apart manner by transversely disposed shorter frame members at opposite ends;
   (4) jig means detachably and selectively associated with said transversely disposed shorter frame members for pre-positioning a plurality of intersecting work components on the table means; and
   (5) mobile carriage means for supporting and movably traversing the fastener guns longitudinally along the table means above said work components.

References Cited
UNITED STATES PATENTS

| | | | |
|---|---|---|---|
| 2,540,106 | 2/1951 | Eichelberger | 227—152 |
| 2,749,873 | 6/1956 | Huffman | 144—288 |
| 2,754,862 | 7/1956 | Kemp | 227—152 |
| 2,755,470 | 7/1956 | Johnson | 227—152 XR |
| 2,777,126 | 1/1957 | Muller | 227—7 |
| 2,811,186 | 10/1957 | Honza | 144—288 |
| 2,958,351 | 11/1960 | Deamer et al. | 144—288 |
| 3,026,519 | 3/1962 | Johnson | 227—154 XR |
| 3,299,920 | 1/1967 | Koenigshof | 144—288 |

TRAVIS S. McGEHEE, *Primary Examiner.*

GRANVILLE Y. CUSTER, *Examiner.*